A. VAN HAAGEN.
Filtering-Apparatus.

No. 200,363. Patented Feb. 12, 1878.

Witnesses
Harry Smith
Thomas McIlvain

Inventor
Anthony Van Haagen
by his Attorneys
Howson and Son

UNITED STATES PATENT OFFICE.

ANTHONY VAN HAAGEN, OF PHILADELPHIA, PENNSYLVANIA.

IMPROVEMENT IN FILTERING APPARATUS.

Specification forming part of Letters Patent No. 200,363, dated February 12, 1878; application filed January 16, 1878.

*To all whom it may concern:*

Be it known that I, ANTHONY VAN HAAGEN, of Philadelphia, Pennsylvania, have invented a new and useful Improvement in Filtering Apparatus, of which the following is a specification:

The object of my invention is to construct a filter in which the close packing of the filtering medium is prevented, the running of channels in the said medium obviated, and its maintenance at such a heat assured that the apparatus can be employed with the best results for the rapid filtering of tallow and other fatty and oily matter.

Figure 1:
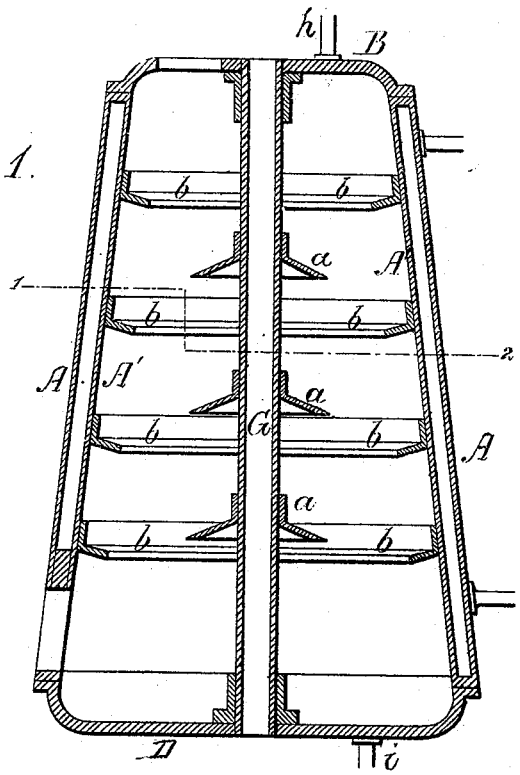
Figure 2:
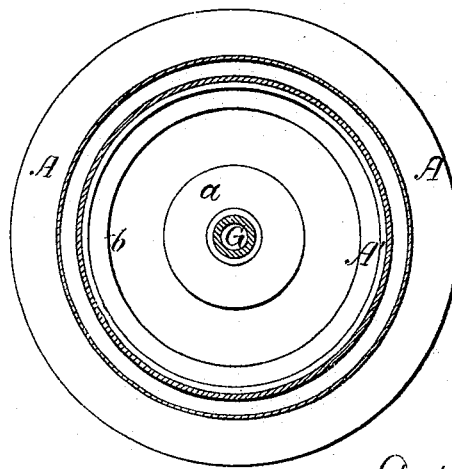

In the accompanying drawings, Figure 1 is a vertical section of my improved filter, and Fig. 2 a sectional plan on the line 1 2.

In the operation of filtering apparatus more or less difficulty has been experienced, owing to the packing of the charcoal and other filtering mediums so tightly as to prevent the free percolation throughout of the material to be filtered, and this has been especially the case in filtering oily and fatty matter.

Another difficulty in filtering such matter has been its maintenance in a proper fluid condition, in order to enable it to pass through the filtering-bed; and a third difficulty has resulted from the tendency of the material to be filtered to force channels through the filtering medium, by which channels the material is apt to escape in an unfiltered condition.

I overcome these difficulties in a manner which I will now proceed to describe.

In the first place, instead of making the filtering-vessel cylindrical, or smaller at the bottom than at the top, which is the usual plan, and which results in tight wedging of the filtering material at and near the bottom of the vessel, I make the vessel of a tapering form, and larger at the lower than at the upper end, as shown in the drawing, the vessel having double inclined walls A A' and an intervening space, through which steam is caused to circulate.

From the cover B to the base D extends a central tube, G, through which, also, steam is caused to circulate, and from which flanges $a$ project at suitable intervals, annular flanges $b$ being also secured to the inner wall A' of the casing.

In filtering fatty and oily matter it is essential that it, as well as the filtering medium, should be maintained at a proper degree of heat, and for this purpose vessels with steam-jackets have been used; but the heat derived from this source did not penetrate far enough into the mass of filtering material, unless the vessels were made inconveniently small, and even in this case the oily and fatty matter would make channels nearest the casing, where the filtering material was hottest.

Attempts have also been made to overcome these difficulties by introducing steam into the vessel; but this also had the effect of cutting channels in the filtering material.

By combining in the filtering-vessel a steam-jacket in the outer casing with the central steam-chamber G, the mass of filtering material must be maintained at a proper degree of heat throughout, and this is assured by the presence of the flanges $a$ and $b$, which serve to conduct the heat of the jacket and central chamber into the body of the filtering material. These flanges serve other useful purposes. While they do not interfere with the proper percolation of the material to be filtered through the mass of filtering material, they prevent the formation of channels through the same, and they also serve to partly suspend the filtering material within the vessel, and prevent it from being packed too closely at the bottom. This is also prevented by the tapering form of the filter, for such of the filtering material as descends has a larger space to occupy than it had above, and hence will not be packed too tightly below.

The central steam-chamber and flanges may be combined with a cylindrical filtering-vessel, or with a vessel of other shape; but I prefer in all cases to use the tapering vessel, smaller above than below.

For smaller filters the central steam-chamber may be dispensed with; but in this case the tapering form of the vessel and the internal flanges $b$ should be retained.

There is a suitable pipe, $h$, in the top B of the vessel, for the introduction of the material to be filtered, and a suitable outlet, $i$, at the bottom D. There are also man-holes at suitable points, for gaining access to the interior of the vessel.

I claim as my invention—

1. A filtering-vessel in which an outer tapering casing, larger below than above, and having a steam-jacket, is combined with internal flanges $b$, secured to the interior of the said casing, as and for the purpose set forth.

2. The combination, in a filtering-vessel, of the central steam-chamber G with flanges $a$ projecting from the casing of the chamber, as specified.

3. The combination of the outer jacketed and tapering casing and its internal flanges with the central tube G and its flanges, as set forth.

In testimony whereof I have signed my name to this specification in the presence of two subscribing witnesses.

ANTHONY VAN HAAGEN.

Witnesses:
HARRY A. CRAWFORD,
HARRY SMITH.